United States Patent [19]

Nowobilski et al.

[11] Patent Number: 4,726,974
[45] Date of Patent: Feb. 23, 1988

[54] VACUUM INSULATION PANEL

[75] Inventors: Jeffert J. Nowobilski, Orchard Park; Arun Acharya, East Amherst; Kenneth C. Kather, Tonawanda, all of N.Y.

[73] Assignee: Union Carbide Corporation, Danbury, Conn.

[21] Appl. No.: 916,554

[22] Filed: Oct. 8, 1986

[51] Int. Cl.$^4$ ............................................. B32B 1/06
[52] U.S. Cl. ................................... 428/69; 428/74; 428/75; 428/76; 428/219; 428/220; 428/303
[58] Field of Search .................. 428/69, 74, 75, 76, 428/302, 303, 220, 219

[56] References Cited

U.S. PATENT DOCUMENTS

| | | | |
|---|---|---|---|
| 2,700,633 | 1/1955 | Bovenkerk | 154/116 |
| 2,742,385 | 4/1956 | Bovenkerk | 154/45 |
| 2,779,066 | 1/1957 | Gaugler et al. | 20/4 |
| 3,170,833 | 2/1965 | Noyes | 161/186 |
| 3,179,549 | 4/1965 | Strong et al. | 161/43 |
| 3,264,165 | 8/1966 | Stickel | 161/43 |
| 3,379,330 | 4/1968 | Perkins, Jr. | 220/9 |
| 4,172,915 | 10/1979 | Sheptak et al. | 428/69 |
| 4,284,674 | 10/1981 | Sheptak | 428/69 |
| 4,444,821 | 4/1984 | Young et al. | 428/69 |

Primary Examiner—Alexander S. Thomas
Attorney, Agent, or Firm—Stanley Ktorides

[57] ABSTRACT

A vacuum insulation panel comprising a defined dual layered enclosure encasing a defined compressed fiberglass substrate which enables easy and effective insulation of large equipment with improved system flexibility and integrity.

23 Claims, 1 Drawing Figure

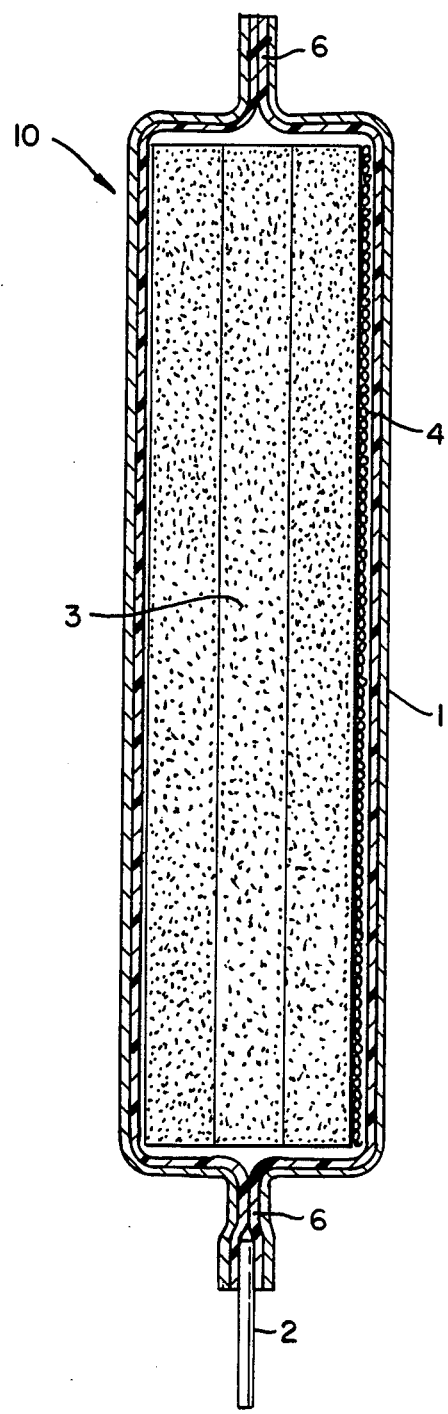

VACUUM INSULATION PANEL

TECHNICAL FIELD

This invention relates generally to insulation panels and more specifically to insulation panels which can be employed to insulate cryogenic equipment such as a cold box of a cryogenic rectification plant.

BACKGROUND ART

Large cryogenic equipment such as liquid nitrogen, argon or oxygen storage tanks, or air separation plant cold boxes are generally insulated from ambient temperatures by filling a casing around the equipment with perlite or rock wool. While generally suitable for the purpose, this kind of insulation is disadvantageous because of its lack of flexibility especially when servicing of the cryogenic equipment is necessary because of the need to remove a very large amount of the insulation to gain access to the equipment.

Fiberglass boards within an evacuated or inert gas filled plastic enclosure are also known for use as insulation for large cryogenic equipment. Such insulating means are disadvantageous due to the permeation of gases through the plastic enclosure and the tendency of the fiberglass to puncture the plastic enclosure.

In response to this problem, fiberglass boards have been encased in metallic foil which serves as a good gas barrier and is much less easily punctured by the fiberglass. However, metallic foil enclosures are disadvantageous because of the relatively high heat transfer rate through the foil at the edges.

It is therefore an object of this invention to provide an insulation panel for cryogenic equipment which can be easily applied to and removed from the equipment.

It is another object of this invention to provide an insulation panel for cryogenic equipment which provides high insulating capability while also having a high degree of flexibility and also having high system integrity.

SUMMARY OF THE INVENTION

The above and other objects which will become apparent to one skilled in the art upon a reading of this disclosure are attained by the present invention which is:

An insulation panel comprising a sealed evacuated film enclosure said film comprised of at least one layer of plastic and at least one layer of metal laminated together, said seal(s) being at points of plastic to plastic contact, said enclosure encasing adsorbent and a shaped article of compressed fiberglass having fiber diameters not exceeding ten microns, said fibers held together by binder to form a smoothened surface.

BRIEF DESCRIPTION OF THE DRAWINGS

The FIGURE which accompanies the written portion of this specification illustrates a preferred embodiment, in cross-section, of the vacuum insulation panel of the invention.

DETAILED DESCRIPTION

The present invention is an insulation panel comprising a defined dual layered film enclosure encasing a defined shaped compressed fiberglass article.

The dual layered film enclosure comprises at least one layer of plastic and at least one layer of metal laminated together. The plastic serves to provide flexibility to the enclosure and to provide facile sealing for the enclosure. The metal serves to provide an effective vapor barrier to the enclosure. Preferably the plastic layer is the inside layer and the metal layer is the outside layer of the dual layered film as this facilitates sealing the enclosure by, for example, heat sealing together the inside plastic layers of two sheets of film or one sheet of film folded over onto itself. The thickness of the dual layered film is generally within the range of from 0.5 to 50 mils and preferably is within the range of from 2 to 10 mils. The thickness of the metal layer is within the range of from 100 to 2000 angstroms and preferably within the range of from 300 to 700 angstroms. Because of its very thin nature, the layer of metal does not detrimentally affect the flexibility of the enclosure and further does not detrimentally affect the heat transfer through the enclosure especially at the edges. However the metal layer still provides an effective vapor barrier to the enclosure.

Among the plastics that can be employed in the dual layered film of this invention, one can name tetraphthalate polyester (Mylar TM), polytetrafluoroethylene (Teflon TM), polyimide (Kapton TM), fluorinated ethylene propylene, polyvinylidene chloride (Saran TM), and polyethylene.

Among the metals that can be employed in the dual layered film of this invention one can name aluminum, silver, gold, chromium, nickel, stainless steel and Inconel TM.

A preferred dual layered film is aluminized Mylar such as Melinex 800 TM and Melinex 850 TM which are commercially available from ICI America.

In a particularly preferred embodiment of the enclosure of this invention, two dual layered films are laminated together at their metal surface layers and the resulting lamination is employed as the dual layered film enclosure of this invention. Such lamination is carried out employing conventional lamination techniques and adhesives which are well known to those skilled in the art.

The shaped article which is encased by the defined enclosure of this invention is comprised of compressed fiberglass. The fiberglass is commercially available as fiberglass mat, for example, from Johns Manville or Owens-Corning. The fiberglass fibers do not exceed ten microns in diameter and preferably do not exceed about five microns in diameter. In this way should a fiber protrude from the shaped article, the small defined fiber diameter will not provide sufficient strength to the fiber to enable it to pierce the enclosure and thus compromise the insulating capability of the insulation panel. The fiberglass is compressed to a density in the range of from 3 to 40, preferably from 5 to 15 pounds per cubic foot. Preferably the fibers are aligned substantially longitudinally as this increases the strength and contributes to the surface smoothness of the shaped article and also reduces thermal conductivity.

The fiberglass is made into a shaped article which enables the panel to conform to the shape of the cryogenic equipment which is being insulated. Any convenient shape may be employed. One very useful shape is a square or rectangular board which facilitates the use of the insulation panels of the invention to insulate a walled enclosure. Another useful shape is a curved surface which facilitates the use of the insulation panels of the invention to insulate a cryogenic tank or other piece of equipment having a curved surface.

The fiberglass fibers of the shaped article are held together by binder which comprises from 5 to 30, preferably from 10 to 20 weight percent, of the shaped article. Preferably the binder is a phenolic type binder. The binder serves to provide a smoothened surface on the shaped article and also serves to keep the individual fibers in place. This reduces the chance of a fiber piercing the enclosure or entering the edge seal of the enclosure and thus enhances the integrity of the vacuum panel of this invention. Among other binders useful in the panel of this invention, one can name silicone type binders and inorganic sodium silicate type binders.

The shaped article of this invention preferably has curvilinear edging essentially completely around its perimeter. Preferably the curve is rounded and has a radius of from ⅛ to one inch, preferably about ¼ inch. When the enclosure of the invention is evacuated, because of the flexible nature of the dual layered film, the film conforms very closely to the shape of the shaped compressed fiberglass article. This enables the vacuum panel to be easily placed into insulation service on a compatibly shaped piece of equipment and enables increased insulation efficiency. However, the very close conformity of the enclosure to the fiberglass substrate increases the risk of a puncture or tear of the enclosure especially at the point of contact with the edge of the substrate. This is heightened by the differential contraction of the fiberglass substrate and the dual layered film enclosure at cryogenic temperatures. The curvilinear nature of the fiberglass substrate edging serves to mitigate this problem and thus further enhances the insulating integrity of the vacuum panels of this invention.

The vacuum panel of this invention contains adsorbent within the enclosure, preferably attached to the fiberglass substrate, most preferably attached to the substrate on the intended cold side of the panel. The adsorbent serves to adsorb gas or vapor which might permeate through the enclosure and thus serves to keep the vacuum within the enclosure from degrading excessively. A particularly preferred type of adsorbent is hydrophobic molecular sieve, commercially available from Union Carbide Corporation and designated LZ-10, LZ-20 or S-115. This hydrophobic molecular sieve is particularly preferred because this type of sieve does not degrade appreciably at the temperature and vacuum conditions at which the panel is intended to operate, and the system is not compromised by water vapor during use because all water vapor would have been eliminated by the cryogenic temperature and a dry nitrogen purge which is characteristic of equipment in cryogenic service and to which the cold side of the panel is exposed when the panel is mounted in position adjacent the cryogenic equipment. During storage at ambient conditions the sieve is not degraded by water vapor ingress due to its hydrophobic nature.

The vacuum insulation panel of this invention is assembled in any effective manner. One convenient assembly procedure involves sealing together three sides of two sheets, or one sheet folded over onto itself, of dual layered film to form a bag with three sealed edges. The fiberglass shaped article may then be placed within the bag through the remaining unsealed edge; alternatively, the fiberglass shaped article may be placed between two unsealed dual layered sheets and three sides of the sheets sealed together. The enclosure is then evacuated through the remaining unsealed side, preferably through a tube, and the enclosure sealed ahead of the tube when the requisite vacuum is attained. The vacuum useful in the vacuum panel of this invention is within the range of from 0.01 to 1000 and preferably is within the range of from 1 to 100 microns of mercury.

Once assembled, the vacuum panel of this invention is attached to the sides of cryogenic equipment and remains in place until servicing of the equipment or some other activity requires the removal of the panel. At such a time, the panel is easily removed and then replaced back on the equipment when the servicing is completed. A particularly convenient means for attaching the panel to the equipment is by two sided adhesive tape or by velcro.

The vacuum panel of this invention is particularly well suited to insulate cryogenic equipment because its defined construction enables a high degree of insulation and a high degree of system integrity through many thermal cycles between ambient and cryogenic temperatures. However, the vacuum panel of this invention may be effectively employed to insulate material at other than cryogenic temperatures. By cryogenic temperatures, it is meant a temperature less than about $-110°$ F.

The vacuum insulation panel of this invention is further illustrated in the FIGURE which represents the vacuum panel in cross-section. Referring now to the FIGURE, vacuum insulation panel 10 is comprised of dual layered film enclosure 1 which encases compressed fiberglass substrate 3. The enclosure is sealed at the edges such as at heat sealed edges 6. Evacuation tube 2 is shown in place at one of the heat sealed edges. Tube 2 is used to evacuate the enclosure and, after the desired vacuum is attained, the enclosure is sealed ahead of the evacuation tube. Adsorbent, such as hydrophobic molecular sieve 4, is attached to one side, i.e. the intended cold side, of the fiberglass substrate.

Now by the use of the vacuum insulation panel of this invention, one can easily and effectively insulate large cryogenic equipment, without the heretofore experienced degree of inflexibility and system integrity loss.

Although the vacuum insulation panel of this invention has been described in detail with reference to certain specific embodiments, those skilled in the art will recognize that there are other embodiments of this invention within the spirit and scope of this claims.

We claim:

1. An insulation panel comprising a sealed evacuated film enclosure said film comprised of at least one layer of plastic and at least one layer of metal laminated together, said seal(s) being at points of plastic to plastic contact, said enclosure encasing adsorbent and a shaped article of compressed fiberglass having fiber diameters not exceeding ten microns, said fibers held together by binder to form a smoothened surface.

2. The panel of claim 1 wherein the plastic is tetraphthalate polyester, polytetrafluoroethylene, polyimide, fluorinated ethylene propylene, polyvinylidene chloride or polyethylene.

3. The panel of claim 1 wherein the metal is aluminum, silver, gold, chromium, nickel, stainless steel or Inconel TM.

4. The panel of claim 1 wherein the dual layered film has a thickness within the range of from 0.5 to 50 mils.

5. The panel of claim 1 wherein the dual layered film has a thickness within the range of from 2 to 10 mils.

6. The panel of claim 1 wherein the film comprises two dual layered film sheets which are laminated together at the metal surfaces.

7. The panel of claim 1 wherein the shaped article is in the shape of a rectangle.

8. The panel of claim 1 wherein the shaped article is in the shape of a curved surface.

9. The panel of claim 1 wherein the shaped article has a density within the range of from 3 to 40 pounds per cubic foot.

10. The panel of claim 1 wherein the fiber diameters do not exceed 5 microns.

11. The panel of claim 1 wherein the binder is present in the shaped article at a concentration within the range of from 5 to 30 weight percent.

12. The panel of claim 1 wherein the binder is a phenolic binder, a silicone binder or an inorganic sodium silicate binder.

13. The panel of claim 1 wherein the shaped article has curvilinear edging essentially completely around its perimeter.

14. The panel of claim 13 wherein the curvilinear edging is defined by a curvature having a radius within the range of from ⅛ to one inch.

15. The panel of claim 1 wherein the adsorbent is attached to the shaped article on the intended cold side of the panel.

16. The panel of claim 1 wherein the adsorbent is hydrophobic molecular sieve.

17. The panel of claim 1 wherein the sealed enclosure is evacuated to a pressure within the range of from 0.01 to 1000 microns of mercury.

18. The panel of claim 1 wherein the edges of the dual layered film enclosure are heat sealed together.

19. The panel of claim 1 additionally comprising two sided adhesive tape or velcro on the outside of the enclosure to facilitate attachment to equipment.

20. The use of an insulation panel comprising a sealed evacuated film enclosure said film comprised of at least one layer of plastic and at least one layer of metal laminated together, said seal(s) being at points of plastic to plastic contact, said enclosure encasing adsorbent and a shaped article of compressed fiberglass having fiber diameters not exceeding ten microns, said fibers held together by binder to form a smoothened surface to insulate cryogenic equipment wherein the panel is positioned adjacent the cryogenic equipment and the cold side of the panel adjacent said equipment is exposed to a dry gas.

21. The use of claim 20 wherein the adsorbent is hydrophobic molecular sieve.

22. The use of claim 20 wherein the adsorbent is attached to the shaped article on the cold side of the panel.

23. The use claim 20 wherein the dry gas is nitrogen.

* * * * *